United States Patent [19]

Long-sheng et al.

[11] Patent Number: 4,590,597
[45] Date of Patent: May 20, 1986

[54] MODULATION TRANSFER SPECTROSCOPY FOR STABILIZING LASERS

[75] Inventors: Ma Long-sheng, Shanghai, China; Leo Hollberg, Red Bank, N.J.; Jon H. Shirley; John L. Hall, both of Boulder, Colo.

[73] Assignee: The United States of America as represented by the Secretary of Commerce, Washington, D.C.

[21] Appl. No.: 612,291

[22] Filed: May 21, 1984

[51] Int. Cl.$^4$ ............................................. H01S 3/13
[52] U.S. Cl. ...................................... 372/32; 372/28; 372/9
[58] Field of Search ...................... 378/32, 29, 26, 28, 378/11, 13, 10, 9, 703; 372/19

[56] References Cited

U.S. PATENT DOCUMENTS 3,742,382 6/1973 Smith .................................... 372/32
3,856,406 12/1974 Noble et al. .......................... 372/28

OTHER PUBLICATIONS

Hall et al., "Optical Heterodyne Saturation Spectroscopy", Appl Phys Lett 39(9), Nov. 1, 1981, p. 680.
Shirley, "Modulation Tranf. Processes in Opt. Heterodyne Saturation Spectros.", Opt. Lett, vol. 7, No. 71, Nov. 1982.
Snyder et al., "High Sensitivity Non-Linear Spect. Using a Freq. Off-Set Pump", Opt. Lett, vol. 5, No. 4, Apr. '80.
Nekazawa et al., "Freq. Stabiliz of 0.633 $\mu$m Line with the Aid of 3.39 $\mu$m Line Locked Chg.", Appl. Phys Lett 35(10), Nov. 15, 1979.
Tanzika et al.. "Preliminary Exp. for Stabilizing Unmodulated He-Ne Laser to an Iodini Hyperfine Comp.", J. Appl Phys 50(i), Jan. 1, 79.

Primary Examiner—Léon Scott, Jr.
Attorney, Agent, or Firm—Eugene J. Pawlikowski; Alvin J. Englert; Douglas E. Jackson

[57] ABSTRACT

A method and apparatus are disclosed for precisely stabilizing a laser to a sub-Doppler resonance of an absorbing gas contained in a cell located external to the laser resonator. Stabilization is based on the detection of modulation transferred onto a previously unmodulated probe beam by the non-linear interactions of the absorbing gas located in a cell which is subject to a counter-running, frequency-modulated saturation beam. Alternatively, the further modulation of the saturation beam can be detected.

12 Claims, 1 Drawing Figure

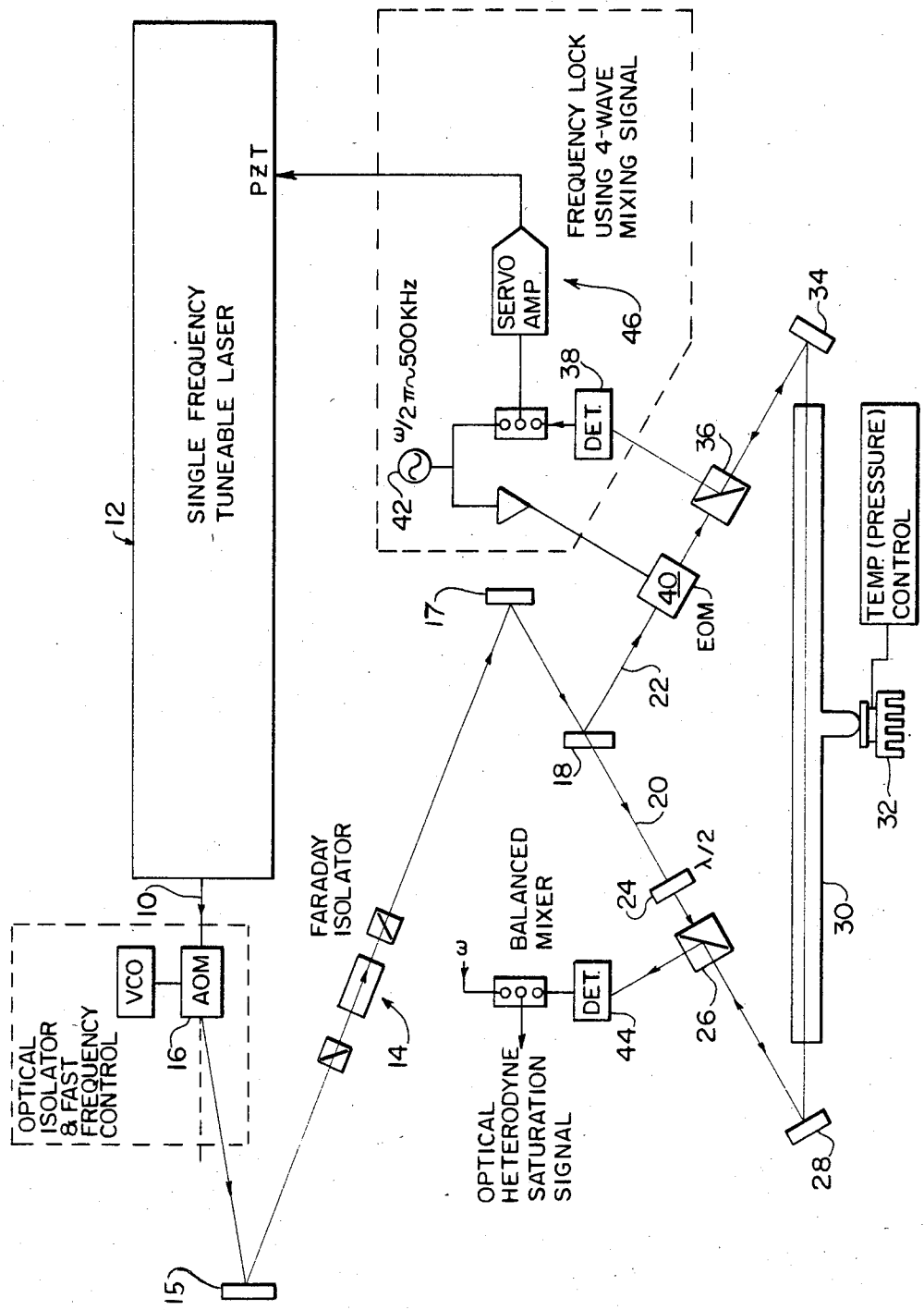

MODULATION TRANSFER SPECTROSCOPY FOR STABILIZING LASERS

FIELD OF THE INVENTION

The present invention relates generally to the stabilizing of a laser, and more particularly to the stabilizing of a laser to a sub-Doppler resonance of an absorbing gas using spectroscopic techniques.

BACKGROUND OF THE INVENTION

Various techniques for stabilizing the frequency of lasers exist in prior art. For example, in U.S. Pat. No. 3,742,382 (Smith), an apparatus for stabilizing a laser to a gas absorption line is disclosed. The apparatus includes a gaseous frequency standard cell through which a first component of the output beam is passed in a first direction and then detected. A second component of the beam is also passed through the cell in a second direction slightly less than 180° from the first direction. The detected signal as a function of frequency has a narrow peak centered on the absorption line of the gas. The width of this peak is the homogeneous line width of the absorbing gas, which is typically much narrower than the Doppler-broadened absorption line. The detected signal is then applied through a feedback loop to control the tuning of the laser resonator.

In "Optical Heterodyne Saturation Spectroscopy", J.L. Hall, L. Hollberg, T. Baer, and H.G. Robinson, *Applied Physics Letters* 39(9), page 680, November 1981, an optical heterodyne saturation spectrometer is disclosed. The spectrometer includes a single frequency laser output which is divided into a probe beam which is phase modulated and a saturating beam which is frequency offset and chopped by an acousto-optic modulator. The two beams are passed in opposite directions through an iodine cell whose pressure is controlled. The signal-bearing probe beam is detected by a fast photodiode.

In "High Sensitivity Non-linear Spectroscopy Using A Frequency-Offset Pump", J. J. Snyder, R. K. Raj, D. Bloch, and M. Ducloy, *Optics Letters*, Vol. 5, No. 4, Page 163, April 1980, a simple method for eliminating coherent background noise and fluctuations from saturation-spectroscopy signals is disclosed. According to this technique, the output beam of a laser is split by a polarizing beam splitter into two beams. The pump beam is frequency shifted and chopped by an acousto-optic modulator and passed through an iodine cell. The probe beam is then passed through the iodine cell in the opposite direction and detected by a photodiode. The photodiode output at the acousto-optic chopping frequency is amplified and demodulated by a lock-in amplifier.

In "Modulation Transfer Processes in Optical Heterodyne Saturation Spectroscopy", J. H. Shirley, *Optics Letters*, Vol. 7, Page 537, November 1982, the transfer of modulation from a phase modulated laser beam to an unmodulated, oppositely running beam in a non-linear resonant gaseous medium is discussed. Heterodyne detection of the transferred modulation reveals multiplex patterns that are distinct for the two mechanisms which account for the transfer, namely, modulated hole burning and reflection from an induced population grating.

SUMMARY OF THE INVENTION

In accordance with the present invention, a method and apparatus for stabilizing a laser to a sub-Doppler resonance of an absorbing gas contained in a cell located external to the laser resonator are disclosed. Initially, the laser beam is split into two beam portions, a probe beam and a saturation beam. The probe beam is directed through the cell in one direction. The saturation beam is frequency modulated to produce sideband optical frequencies, and this modulated saturation beam is directed through the cell coaxial and antiparallel to the probe beam. In the cell, the two beams interact and a cell modulation of both beams occurs. The resulting cell modulation of one of the beams is then detected and used to stabilize the laser.

In one preferred embodiment of the present invention, the cell modulated probe beam is directed to an amplitude modulation detector which is tuned to receive signals at the frequency of the frequency-modulated saturation beam. Alternatively, the cell modulated saturation beam is directed to an optical photodetector unit where the optical heterodyne saturation absorption resonances of the cell modulator saturation beam are detected.

Preferably, a reflection isolating means is provided for isolating the laser from reflections from the probe beam and saturation beam. In addition, a half-wave plate may be used to rotate the plane of polarization of the probe beam 90° relative to the saturation beam. With a polarizer for the probe beam and a polarizer for the saturation beam, this configuration makes optimum use of the available laser power. Alternately, a single beam splitter or a pair of beam splitters may be used to merge the two beams and/or to separate the signal-bearing beam from the merged beams.

Other features and advantages of the present invention are stated in or apparent from a detailed description of the presently preferred embodiments of the invention found hereinbelow.

BRIEF DESCRIPTION OF THE DRAWINGS

The single FIGURE is a schematic representation of the modulation transfer spectroscopy apparatus for stabilizing lasers according to the present invention.

Detailed Description of the Preferred Embodiments

The present invention describes a useful technique for precisely stabilizing a laser to a sub-Doppler resonance of an absorbing gas contained in a cell located external to the laser resonator. The technique makes use of three advanced techniques of contemporary laser spectroscopy for accurate laser servo-stabilization. The component techniques are high frequency modulation, FM sideband spectroscopy, and 4-wave mixing. Two embodiments of the present invention are depicted in the drawing.

With reference to FIG. 1, a laser beam 10 from a CW single frequency laser source 12 is isolated from reflections by use of a Faraday Isolation device 14 and/or an acousto-optic modulator 16. Laser beam 10 is then divided into two portions using beam splitting mirror 18 after suitable reflection by mirrors 15 and 17. Alternatively, acousto-optic modulator 16 could be used to effect the beam splitting.

Beam splitting mirror 18 splits laser beam 10 into a counterclockwise probe beam 20 and a clockwise saturation beam 22. Probe beam 20 passes through a half-wave plate 24 to rotate the plane of polarization of probe beam 20 by 90°. Next, probe beam 20 passes through a prism polarizer 26 and is finally reflected by mirror 28 into an absorbing cell 30.

Absorbing cell 30 is filled with a suitable absorbing gas such as iodine vapor. Preferably, the pressure of the absorbing gas in absorbing cell 30 is controlled by a Peltier-effect thermoelectric cooler 32 to produce a collision-limited resonance with $\gamma_2 \simeq 2\pi \times 500$ kHz. After probe beam 20 passes through absorbing cell 30, probe beam 20 is reflected by a mirror 34 to a prism polarizer 36. From prism polarizer 36, probe beam 20 is reflected to a photodetector unit 38 which is tuned to receive signals at a frequency $\omega$.

From beam splitting mirror 18, clockwise-running saturation beam 22 passes through an electro-optic modulator 40. Electro-optic modulator 40 produces a phase-modulation index $\beta$ by a sinewave Rf source 42 operating at the frequency $\omega$. This phase modulation of saturation beam 22 results in the generation of new "side band" optical frequencies, principally at $\Omega \pm \omega$, which are located symmetrically around a laser optical frequency $\Omega$. At higher modulation excitation levels, significant power at other sideband frequencies is produced. In general, saturation beam 22 has an optical spectrum of the form:

$$E_s \sin(\Omega t + \beta \sin \omega t) = E_s \{J_0(\beta) \sin \Omega t + J_1(\beta) [\sin(\Omega + \omega)t - \sin(\Omega - \omega)t] + J_2(\beta)[\sin(\Omega + 2\omega)t + \sin(\Omega - 2\omega)t] + J_3(\beta)[\sin(\Omega + 3\omega)t - \sin(\Omega - 3\omega)t] + \ldots\}$$

The perfect odd symmetry displayed by the odd order Fourier sidebands is fundamentally important as it essentially guarantees that the final observable resonance observed at $\omega$ is ideally (anti) symmetric around its center. This has clear and favorable implications for high accuracy servo performance.

From electro-optic modulator 40, saturation beam 22 passes through prism polarizer 36 and is reflected by mirror 34 through absorbing cell 30. It should be appreciated that saturation beam 22 passes through absorbing cell 30 coaxial with and antiparallel to probe beam 20. In absorbing cell 30, the modulated saturation beam 22 interacts with the gaseous molecules of the absorbing gas which have an appropriate velocity to be Doppler tuned into resonance with any of the several spectral components of saturation beam 22. After absorbing cell 30, saturation beam 22 is steered by mirror 28 and prism polarizer 26 onto an optical photodetector unit 44.

At optical photodetector unit 44, narrow, strong sub-Doppler resonances (optical heterodyne saturated absorption resonances) are detected as described in the Hall et al reference noted above which is incorporated herein by reference. As noted by the authors in this article, this type of nonlinear resonance is unfortunately contaminated by some amount of a broad background resonance associated with the Doppler profile. Although modulated-saturation methods are successful in isolating the sub-Doppler resonance from the background, the need for saturation chopping renders this approach somewhat less desirable than the alternative discussed below.

As discussed in the article by Snyder et al, discussed above and incorporated herein by reference, it is possible to use a 4-wave mixing process to obtain narrow resonances at a photodetector unit such as unit 38. As explained by these authors, most laser amplitude noise is confined to relatively low Fourier frequencies. For example, in an article entitled "Progress Toward Phase-Stable Optical Frequency Standards", J. L. Hall, L. Hollberg, Ma Long-Sheng, T. Baer, and H. G. Robinson, *Journal de Physique*, Colloque C8, Supplement 12, Tome 42, Page C8-59, December 1981, the authors found an 80 dB signal/noise improvement in using modulation frequencies 500 kHz and above, rather than, say, 1 kHz for the case of an Ar+laser-pumped dye lasers. However, for serious spectroscopy, and especially for precise laser locking, the technique described in the Snyder et al reference is fatally flawed because it uses amplitude- modulation of the saturation beam. The problems are twofold. First, the AM method produces unsymmetrical resonance profiles. Second, since the modulation and detection frequencies are equal, it is exceptionally difficult to prevent scattering (by dust and other defects in the cell windows and other optical components) of the chopped saturation beam backward into the probe beam direction. Even a very small amount of scattered light may be important because it can be heterodyne-detected in the presence of the probe beam.

The solution to this problem presented by the present invention is the use of phase-modulation of the saturation beam. This produces two advantages: (1) the profiles are rigorously symmetrical and (2) backscattered light has almost no effect since it is amplitude-modulated probe light which is detected and the backscattered saturation beam light is purely phase-modulated.

The resonances observable in the present invention arise purely from the nonlinear molecular response in the presence of the FM saturation beam 22 and the unmodulated probe beam 20. Basically, modulation is "transferred" from saturation beam 22 to probe beam 20 because the molecular absorption coefficient is periodically saturated, giving rise to a time dependent Beer's law absorption of the probe beam. The FM-modulated saturation beam is partially analyzed into its spectral components by the molecular absorber. However, as the present invention is concerned with the regime $\omega \delta \gamma_2$, two of the frequencies of the saturation beam are preferentially able to cause saturation. Lacking the full contribution of the other beam, a residual time-dependent saturation is produced. A detailed analysis of this case is described in the article by Shirley which is mentioned above and which is incorporated herein by reference. This article shows that these "modulation transfer" resonances have the form:

$$\text{Detected Signal} = ASJ_0(\beta)J_1(\beta)\{[L_1 - L_{\frac{1}{2}} + L_{-\frac{1}{2}} - L_{-1}] \cos(\omega t + \phi) + [-D_{-1} + D_{\frac{1}{2}} + D_{-\frac{1}{2}} - D_1] \sin(\omega t + \phi)\}$$

In this equation, A is an amplitude scaling factor and $S = 4\mu^2 E^2/_\hbar{}^+ 2\gamma_1\gamma_2$ is the saturation parameter, where $\mu$ is the transition moment, $\gamma_1$ is the relaxation rate of the population, and $\gamma_2$ is the relaxation rate of the induced dipole moment. The factors $L_j = 1/(1+x_j^2)$ and $D_j = x_j L_j$ are abbreviations for the Lorenz absorption and dispersion resonances, $x_j = (\Omega - \Omega_o - j\omega)\gamma_2$ and j gives the resonance location in the spectrum relative to the free molecule absorption frequency $\Omega$. In the above equation, it has been found (and confirmed experimentally) that a choice of $\phi$ near 50° and modulation $\omega \simeq 0.7\gamma_2$ are suitable to maximize the slope of the signal detection near $\Omega = \Omega_o$.

It should be appreciated that it is an important attribute of the resonance line shape of the above equation that it represents a differential operator essentially of third order. With the further condition that $\omega \simeq \gamma_2 << $ spacing between the $I_2$ hyperfine resonances, an almost ideal technique for avoiding line pulling by the wings of nearby resonances is produced. Thus, the intrinsic property of the signal that it contains only sub-Doppler resonance components is augmented by the fact that they are measured with a highly localized, third-derivative-like sensitivity function. In consequence, extremely stable and straight baselines are produced in between the resonances. The signal-to-noise ratio cost relative to optical heterodyne saturation spectroscopy is a factor of about 3, which is essentially insignificant in view of the advantage of totally suppressing Doppler and other background problems.

A useful understanding of the physical origin of the resonances can be based on the notion of a "walking-wave" grating of saturated atoms burned by one of the saturation beam modulation sidebands taken with the counter-running unmodulated probe. Various spectral components of the saturating beam are Bragg-reflected and Doppler-shifted by such a moving grating to produce optical fields running toward the detector. Equations for $X^{(3)}$ frequency mixing ($E_4 = X^{(3)} \cdot E_1 \cdot E^*_2 \cdot E_3$) taken with the saturation and Doppler shift equations lead to resonances at the 4 locations given by the above Detected Signal equation.

From photodetector unit 38, a suitable signal is produced which is sent by a suitable servo unit 46 to stabilize laser source 12 as shown schematically in the FIGURE. A servo unit of this type is well known in the art and is not described further. In a similar manner, the optical heterodyne saturation signal produced by photodetector unit 44 is alternatively used to stabilize laser source 12.

It should be appreciated that the present invention has the following advantages:

1. A high signal/noise ratio within 10dB of the noise level of the probe signal by use of a modulation frequency sufficiently high to avoid laser excess noise;
2. Resonance profiles of ideal antisymmetry which are eminently suitable for high precision spectroscopy and laser frequency control;
3. Essentially perfect suppression of all additive baseline problems such as offset and drift; and
4. A spectral response which is highly localized (approximately a third derivative for low modulation frequencies) and which strongly rejects the shift and other influences produced by the wings of the neighboring lines.

Although the present invention has been described with respect to an HeNe laser source, and an $I_2$ absorbing gas, it should be appreciated that other lasers such as tunable dye lasers or He-I or He-Se lasers could be used with the $I_2$ absorption. Alternatively, tuneable dye lasers, He-Cd, He-Se or other lasers could be used with $Te_2$ molecular absorption. Other homonuclear dimers such as $S_2$ and $Se_2$ are also presumably suitable for such absorption work in the ultraviolet range. It is also expected that utltimately single frequency injection lasers may also be suitably stabilized according to the present method and apparatus.

Thus, while the present invention has been described with respect to exemplary embodiments thereof, it will be understood by those of ordinary skill in the art that variations and modifications can be effected within the scope and spirit of the invention.

We claim:

1. A method of stabilizing a laser to a sub-Doppler resonance of an absorbing gas contained in a cell located external to the laser resonator, said method comprising the steps of:
   splitting the laser beam into two beam portions, namely, a first probe beam for unmodulate probing of the cell and a second saturation beam for saturation with optical sideband frequencies;
   directing the first beam through the absorbing gas in the cell;
   frequency-modulating the second beam to produce sideband optical frequencies;
   directing the modulated second beam through the cell coaxial with and antiparallel to the first beam where the absorbing gas causes the beams to interact in the cell and a cell modulation of both beams to result;
   detecting the resultant cell modulation of one of the two beams portions exiting from the cell; and
   stabilizing the laser using feedback of the detected cell modulation of the one beam portion.

2. A method of stabilizing a laser as claimed in claim 1 wherein the detecting of the cell modulation includes the step of directing the cell modulated first beam to an amplitude-modulation detector tuned to receive signals at the frequency of the frequency-modulated second beam.

3. A method of stabilizing a laser as claimed in claim 1 wherein the detecting of the cell modulation includes the step of directing the cell modulation second beam to an optical photodetector unit where optical heterodyne saturated absorption resonances are detected.

4. A method of stabilizing a laser as claimed in claim 1 and further including the step of rotating the plane of polarization of one of the beams 90° before passing the beam through the cell.

5. An apparatus for stabilizing a laser to a sub-Doppler resonance of an absorbing gas comprising:
   a beam splitting means for splitting a beam emitted by the laser into two beam portions, a first probe beam for unmodulate probing of the cell and a second saturation beam for saturation with optical sideband frequencies;
   an absorption cell containing the absorbing gas;
   a first beam directing means for directing said first beams through the gas in said absorption cell;
   a frequency-modulating means for frequency-modulating said second beam;
   a second beam directing means for directing said frequency-modulated second beam through the gas in said absorption cell coaxial with and antiparallel to said first beam whereby the absorbing gas causes said beams to interact in said cell and a cell modulation of both beams to result;
   a modulation detector means for detecting the cell modulation of one of said beams;
   a feedback means for detecting changes in the detected cell modulation of said one of said beams; and
   a stabilizer means for stabilizing the laser frequency using said detected changes.

6. An apparatus for stabilizing a laser as claimed in claim 5 wherein said modulation detector means detects the optical heterodyne saturated absorption resonances of said saturated beam.

7. An apparatus for stabilizing a laser as claimed in claim 5 wherein said modulation detector means detects the amplitudemodulation of said first beam.

8. An apparatus for stabilizing a laser as claimed in claim 7 and further including a quarter-wave plate for rotating the plane of polarization of one of said first beam and said second beam by 90°.

9. An apparatus for stabilizing a laser as claimed in claim 8 and further including a reflection isolating means for isolating the laser from reflections from said first beam and said second beam.

10. An apparatus for stabilizing a laser as claimed in claim 9 wherein said modulation detector means is tuned to receive signals at the frequency of said frequency-modulating means.

11. An apparatus for stabilizing a laser as claimed in claim 10 and further including a control means for controlling the pressure of the absorbing gas in said absorption cell.

12. An apparatus for stabilizing a laser as claimed in claim 10 wherein said first beam directing means includes a polarizer for polarizing said first beam and said second beam directing means includes a polarizer for polarizing said saturation beam.

* * * * *